(12) United States Patent
Perticaroli et al.

(10) Patent No.: US 11,038,422 B2
(45) Date of Patent: Jun. 15, 2021

(54) SINGLE INDUCTOR MULTIPLE OUTPUT REGULATORS

(71) Applicant: u-blox AG, Thalwil (CH)

(72) Inventors: Stefano Perticaroli, Rome (IT);
Simone Bongiovanni, Rome (IT);
Danilo Ruscio, Rome (IT); Volha Varlamava, Rome (IT); Filippo Neri, Thalwil (CH)

(73) Assignee: u-blox AG, Thalwil (CH)

( * ) Notice: Subject to any disclaimer, the term of this patent is extended or adjusted under 35 U.S.C. 154(b) by 0 days.

(21) Appl. No.: 16/472,853

(22) PCT Filed: Dec. 23, 2016

(86) PCT No.: PCT/EP2016/082574
§ 371 (c)(1),
(2) Date: Jun. 21, 2019

(87) PCT Pub. No.: WO2018/113996
PCT Pub. Date: Jun. 28, 2018

(65) Prior Publication Data
US 2019/0372464 A1 Dec. 5, 2019

(51) Int. Cl.
*H02M 3/158* (2006.01)
*G05F 1/46* (2006.01)
*H02M 1/00* (2006.01)

(52) U.S. Cl.
CPC .......... *H02M 3/1582* (2013.01); *G05F 1/46* (2013.01); *H02M 2001/009* (2013.01)

(58) Field of Classification Search
CPC .. H02M 3/1582; H02M 2001/009; G05F 1/46
See application file for complete search history.

(56) References Cited

U.S. PATENT DOCUMENTS 6,275,016 B1 8/2001 Ivanov
7,565,559 B2 * 7/2009 Chapuis .............. H02J 13/0003
713/300

(Continued)

FOREIGN PATENT DOCUMENTS

CN       105790582 A  *  7/2016
EP          3432454 A1 *  1/2019  ........ H02M 3/33561

OTHER PUBLICATIONS

International Search Report and Written Opinion dated Nov. 21, 2017 in International Application No. PCT/EP2016/082574.

*Primary Examiner* — Kyle J Moody
*Assistant Examiner* — Jye-June Lee
(74) *Attorney, Agent, or Firm* — Finnegan, Henderson, Farabow, Garrett & Dunner LLP

(57) ABSTRACT

Disclosed is a circuit for controlling a single-inductor multiple-output voltage regulator. The voltage regulator includes the single inductor and is configured to generate an independent regulated voltage at each of a plurality of outputs. The circuit includes: a plurality of output switches configured to selectively respectively connect each of the plurality of outputs to a first inductor terminal of the inductor; and a controller configured to control the plurality of output switches in a plurality of switching periods such that, in an operational state, each of the plurality of outputs is periodically connected to the first inductor terminal for a respective connected time duration to generate the regulated voltage at a corresponding output.

25 Claims, 5 Drawing Sheets

(56) References Cited

U.S. PATENT DOCUMENTS

| | | | |
|---|---|---|---|
| 9,647,554 B1* | 5/2017 | Oh | H02M 3/158 |
| 9,692,296 B1* | 6/2017 | Dash | H02M 3/04 |
| 2006/0114624 A1* | 6/2006 | Sharma | H02M 3/158 |
| | | | 361/18 |
| 2008/0231115 A1* | 9/2008 | Cho | H02J 1/08 |
| | | | 307/41 |
| 2009/0309567 A1* | 12/2009 | Morroni | H02M 3/157 |
| | | | 323/283 |
| 2011/0068757 A1* | 3/2011 | Xu | H02M 3/158 |
| | | | 323/271 |
| 2014/0225577 A1 | 8/2014 | Ivanov et al. | |
| 2015/0008742 A1* | 1/2015 | Huang | H02M 3/158 |
| | | | 307/31 |
| 2017/0012529 A1* | 1/2017 | Yamada | H02M 3/158 |
| 2017/0310313 A1* | 10/2017 | Wong | G01R 19/175 |
| 2018/0062515 A1* | 3/2018 | Jung | H02M 3/33561 |
| 2019/0280594 A1* | 9/2019 | Hang | H02M 3/158 |

* cited by examiner

SINGLE INDUCTOR MULTIPLE OUTPUT REGULATORS

CLAIM FOR PRIORITY

This application is a U.S. national phase entry under 35 U.S.C. § 371 from PCT International Application No. PCT/EP2016/082574, filed Dec. 23, 2016, of which this application claims priority, which is incorporated herein by reference.

The present invention relates to control circuits for voltage regulators and in particular to control circuits for a single inductor multiple output voltage regulator operable to provide an independent regulated voltage at each of a plurality of outputs using a single inductor.

Single-Inductor Single-Output (SISO) DC-DC converters, otherwise known as DC-DC switching regulators, are well known in the art. Switches are used to appropriately store and release energy in the inductor using non-overlapping phases that are a fraction (each typically approximately one half) of the switching period. The circuits include a feedback control-loop to ensure the output is as close as possible to the required voltage level. Examples include step-down (buck), step-up (boost) and buck-boost DC-DC converters or switching regulators.

Previously, in order to provide a switching regulator capable of supplying an independent DC voltage to more than one output load, a separate inductor was needed for each individual output. Since inductors are bulky and difficult to integrate, these switching regulators require a larger circuit area and can be also relatively inefficient due to the losses associated with switching multiple inductors.

More recently, DC-DC switching regulators (hereafter regulators) capable of providing two or more outputs with an independent DC voltage have been described. Such topologies, known as Single Inductor Multiple Output (SIMO) regulators, have the advantage of only requiring one inductor to be either connected or implemented on the chip (the inductor may be implemented on-chip or off-chip). As a consequence, the number of discrete components to be connected (and therefore number of connections), or the number of on-chip components and consequent required "real estate" area on-chip is reduced, ultimately reducing cost and improving reliability. Such regulators operate by allowing the single inductor to be time-shared amongst two or more outputs through deployment of additional switches on the output side of the inductor.

However unlike SISO regulators, variations in one or more outputs may affect other outputs since all outputs share one common inductor. Consequently, the design of SIMO regulators presents a formidable challenge, in particular for the avoidance of cross-regulation, instability and incorrect control of switching instances. Cross-regulation is where a load change on one output results in a compensatory voltage adjustment (and therefore voltage change) on another output.

It would be desirable to provide a single inductor multiple output voltage regulator with improved stability and/or reduced cross-regulation.

SUMMARY OF INVENTION

In a first aspect of the invention there is provided a control circuit for a single inductor multiple output voltage regulator, the voltage regulator comprising an inductor and being operable to provide an independent regulated voltage at each of a plurality of outputs, the control circuit comprising: output switches for selective connection of each output to a first inductor terminal of the inductor; and a controller operable to control said output switches in a plurality of switching periods such that, in a first operational state, each output is periodically connected to the first inductor terminal for a respective connected time duration to generate said regulated voltage at that output, wherein said connected time durations are each dependent on at least one historical voltage value sampled in an earlier switching period on at least a first of said outputs.

In a second aspect of the invention, there is provided a control circuit for a single inductor multiple output voltage regulator, the voltage regulator comprising an inductor and being operable to provide an independent regulated voltage at each of a plurality of outputs, the control circuit comprising: output switches for selective connection of each output to a first inductor terminal of the inductor; and a controller operable to control said output switches in a plurality of switching periods, such that, in a first operational state, each output is periodically connected to the first inductor terminal for a respective connected time duration to generate said regulated voltage at that output, wherein the controller is operable to designate one of said outputs as a priority output, said priority output being the output for which at least a first portion of its corresponding connected time duration is first calculated, said controller being further operable such that the priority output designation is periodically switched to a different one of said outputs.

In a third aspect of the Invention, there is provided a control circuit for a single inductor multiple output voltage regulator, the control circuit comprising an inductor and being operable to provide an independent regulated voltage at each of a plurality of outputs, the control circuit comprising: output switches for selective connection of each output to a first inductor terminal of the inductor; and a controller operable to control said output switches in a plurality of switching periods such that, in a first operational state, each output is periodically connected to the first inductor terminal for a respective connected time duration to generate said regulated voltage at that output; said controller being further operable to: determine whether the voltage regulator is in a locked condition; determine whether the locked condition is valid; and if the locked condition is invalid, to use a respective alternative voltage regulator to supply one or more of the outputs.

In a fourth aspect of the invention, there is provided a single inductor multiple output voltage regulator operable to provide an independent regulated voltage at each of a plurality of outputs, comprising: the control circuit of any preceding aspect; and said inductor.

Further optional aspects of the invention are as disclosed in the appended dependent claims.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

Described herein are methods for reducing cross-regulation and/or increasing stability of a single inductor multiple output voltage regulator, and single inductor multiple output voltage regulators implementing such methods. The proposed method is herein described as a Charge Controlled Energizing Cycle per Switching Period (CCECSP) method, and is suitable for driving a set of switches to obtain a SIMO DC-DC regulator. Described herein is a buck SIMO DC-DC regulator; however it will be readily apparent that the disclosure is not limited to such, and is equally applicable to a boost SIMO DC-DC regulator or to a buck-boost SIMO DC-DC regulator. The regulator may generate two or more independent output voltages. The independent output voltages may be all at different voltage levels, or two (or more) of the independent output voltages may be at the same level.

Figure 1:
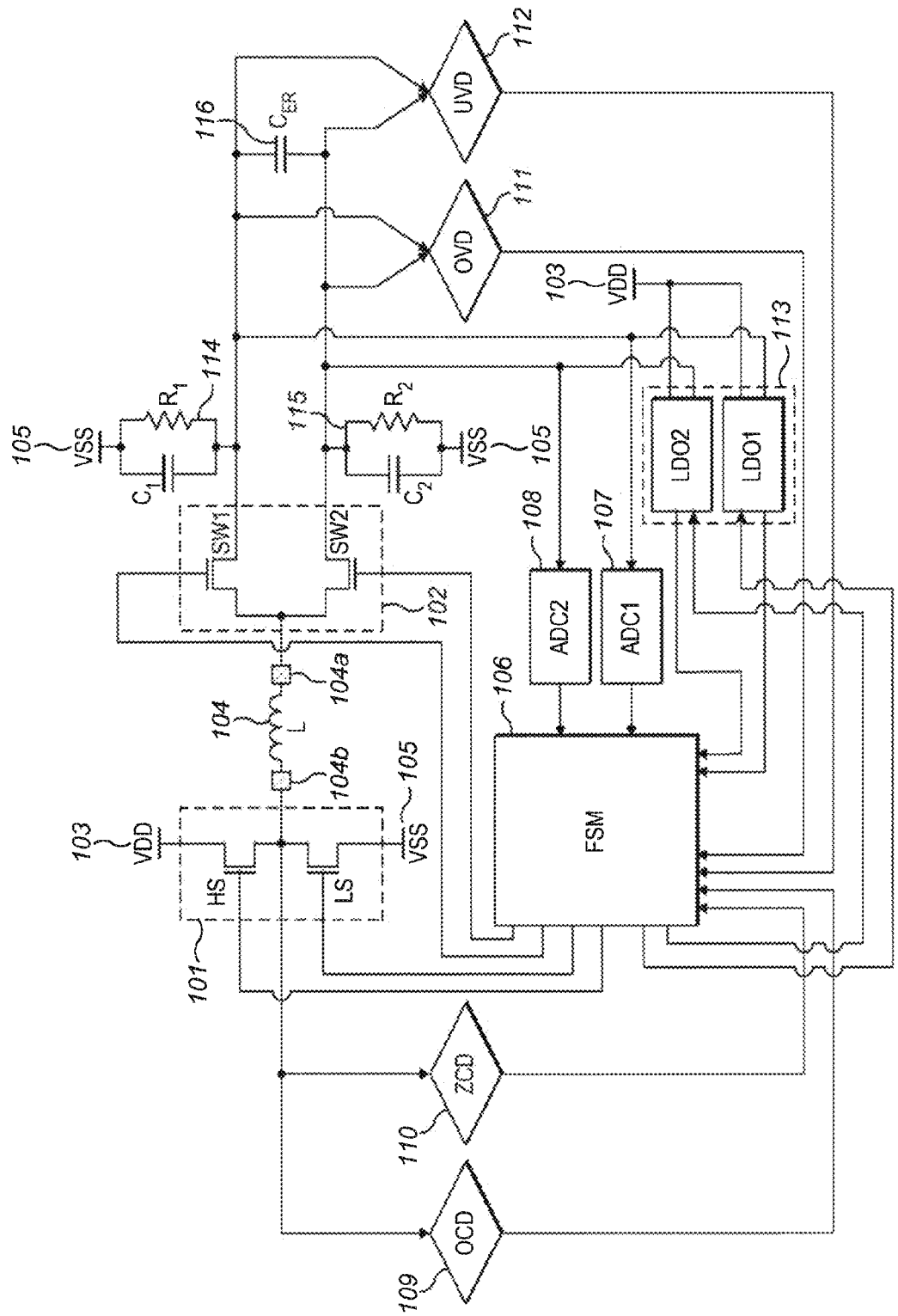
FIG. 1 is a single inductor multiple output voltage regulator according to an embodiment of the invention.

FIG. 1 illustrates a SIMO regulator capable of regulating two independent outputs according to the concepts described herein. Such regulators are sometimes referred to as single inductor dual output (SIDO) regulators. The buck regulator comprises a pair of input side electronic switches 101 and a pair of output side switches 102 as illustrated. It should be noted that regulators with more than two outputs would require additional switches, at least one extra switch per output, along with additional voltage and current sensing connections for each output. An additional low dropout regulator (LDO) circuit may also be provided for each of the additional outputs.

Returning to the dual output example of FIG. 1, the output side switches 102 selectively connect a first inductor terminal 104a of an inductor 104 having inductance L to a respective output: specifically first output side switch SW1 connects the inductor to first output 114 and second output side switch SW2 connects the inductor to second output 115. Input side switches 101 selectively connect a second terminal 104b of the inductor 104 to one of two supply voltages, and comprise a high-side switch HS which is responsible for allowing current to flow from voltage supply VDD 103 through the inductor 104, and a low-side switch LS which is responsible for allowing current to flow from the inductor 104 toward voltage supply VSS 105.

A finite state machine (FSM) 106 receives digital signals representative of the voltages sensed at each output, having been digitised by respective analogue-to-digital converters (ADCs), specifically ADC1 107 and ADC2 108. Further inputs to FSM 106 are provided by a set of interrupt triggering signals from Over Current Detector (OCD) 109, Zero Current Detector (ZCD) 110, Over Voltage Detector (OVD) 111 and Under Voltage Detector (UVD) 112; and from low-dropout regulator (LDO) circuits 113. In the SIDO illustrated, the output loads for each output are represented by a respective capacitor ($C_1$, $C_2$) and resistor ($R_1$, $R_2$) pair connected in parallel for the first output 114 and second output 115, respectively. A bridge capacitor $C_{ER}$ 116 is connected between the outputs 114, 115 in order to decrease the equivalent series resistance (ESR) effect due to each output load's capacitor ($C_1$, $C_2$). Additionally, the bridge capacitor 116 decreases the voltage drop on the opposite output, thereby reducing cross-correlation. In embodiments where there are more than two outputs, a capacitor switching network may be provided for switching the bridge capacitor between the two outputs having switching transition 180 degrees out of phase at any instant. The FSM 106 will know which transitions occur, and therefore can control the capacitor switching network accordingly.

OCD 109, ZCD 110, OVD 111 and UVD 112 may each comprise an open-loop comparator based detection circuit. Each detection circuit may comprise a sensor (voltage sensor or current sensor as appropriate) to obtain a sensed (voltage or current) value. The open-loop comparator translates this sensed value into a binary indicator by comparing the sensed value to a corresponding threshold. The binary indicator will be set to an appropriate value indicating either a normal condition or an abnormal condition (i.e., over current condition, zero current condition, over voltage condition or under voltage condition as appropriate). Based on the binary indicator, an appropriate interrupt may be generated and stored in a "current state" register of the FSM 106. When an interrupt is detected, the FSM 106 transitions to a corresponding state as described in the next section and illustrated in FIG. 3.

Overview of Start-Up and Steady-State Regimes and Management of Interrupts

Figure 2:
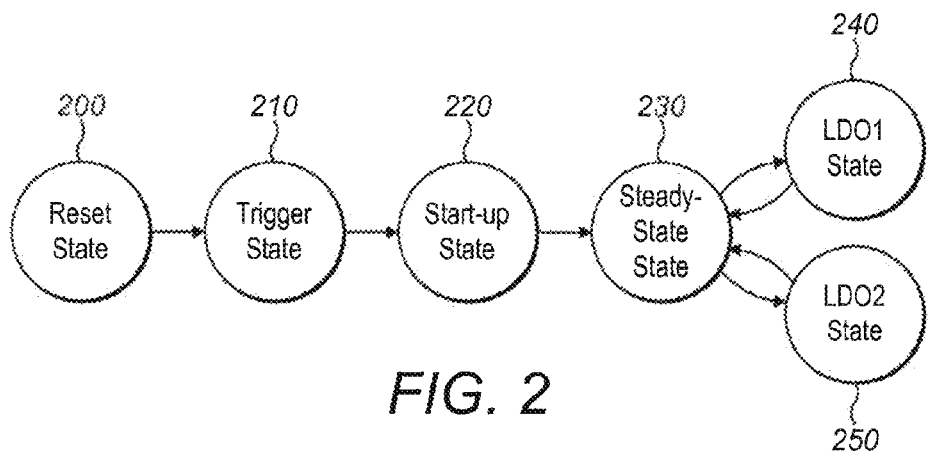
FIG. 2 is a state diagram of a finite state machine of a single inductor multiple output voltage regulator according to an embodiment of the invention.

FIG. 2 illustrates an example sequence of operational states according to FSM 106. Following a "reset" state 200, the state of the FSM proceeds to a "trigger" state 210. In "trigger" state 210, all analogue circuits are initialized to ensure that they fully enter into a regime status. After this state, the FSM transitions to a "start-up" state 220 and remains in this state until a first voltage level of at least one of the outputs 114, 115 exceeds a required voltage level. Once this occurs, the FSM 106 enters into a "steady-state" state 230, during which instant the timings of the charging and discharging cycles for each of the outputs 114, 115 are determined according to the CCECSP algorithm implemented in the FSM 106. In this "steady-state" state, the FSM 106 adaptively maintains the voltage developed across each output 114, 115 at the required level. There may be two or more additional states, one for each SIMO output. Specifically in this example an "LDO1" state 240 and an "LDO2" state 250 is provided, for entering (for example) when operation in the "steady-state" state is deemed invalid. The actions taken in each of these states are similar except that they relate to different outputs, i.e. "LDO1" state 240 corresponds to the first output and "LDO2" state 250 corresponds to the second output. The "LDO1" state and "LDO2" state will be explained in further detail below. Transitions between the "start-up" state 220, "steady-state" state 230 and either of the "LDO1" state 240 and "LDO2" state 250 is principally governed by the interrupt signals described in relation to FIG. 1.

During the "start-up" state 220 and "steady-state" state 230, a switching sequence defines a respective time duration in which the inductor is connected to each output. The "connected time duration" for a particular output is the time duration that the inductor is connected to that output. The connected time duration for each output will comprise a charging phase and discharging phase corresponding to that output, each of variable duration. As such, the connected time duration corresponding to each output will be variable with their sum always being equal to the switching period $T_{sw}$. The charging phase and discharging phase of a connected time duration may comprise adjacent slots in a time period, or their slots may be separated by charging and/or discharging phases corresponding to other outputs. The order of the charging phase and discharge phase of a particular connected time duration within a switching period can be varied and/or is arbitrary.

In the specific examples described herein (with two outputs), the time duration of the connection for the first output comprises the sum of a first charging phase time duration to and a first discharging phase time duration td, and the connected time duration for the second output comprises the sum of a second charging phase time duration tb and a second discharging phase time duration tc. These four different phases of respective durations ta, tb, tc, td are used to deliver or remove charge at the outputs of the SIMO regulator by storing or releasing energy in the inductor. For each additional output there will be a further corresponding connected time duration comprising a charging period and discharging period.

Figure 3A:
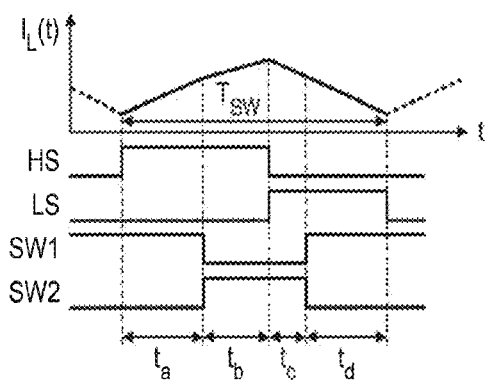
FIGS. 3(a)-(d) are a series of timing diagrams showing the behaviour of the inductor current of a single inductor multiple output voltage regulator according to an embodiment of the invention.

FIG. 3(a) illustrates such operation. It shows (top) the inductor current against time during a switching period divided into the four phases of respective durations ta, tb, tc, td, and below this the corresponding switch control signals for switches HS, LS, SW1, SW2 over the same time. The four different phases comprise, more specifically:

a first charging phase of time duration to for charging the first output 114, obtained by closing switches HS and SW1 with switches LS and SW2 open;

a second charging phase of time duration tb for charging the second output 115, obtained by closing switches HS and SW2 with switches LS and SW1 open;

a first discharging phase of time duration tc for discharging the second output 115, obtained by closing switches IS and SW2 with switches HS and SW1 open; and a second discharging phase of time duration td for discharging the first output 114, obtained by closing switches LS and SW1 with switches HS and SW2 open.

It should be noted that the principle can be extended to any number of outputs by providing an extra switch (and control signal) for each additional output as readily recognised by one skilled in the art. The sum of time durations ta, tb, tc and td (plus any additional time durations for any other outputs) is always equal to the switching period $T_{sw}$; however the individual duration of each time duration, and therefore the connected time duration for each output, can be adjusted by an algorithm which will be described.

Figure 3B:
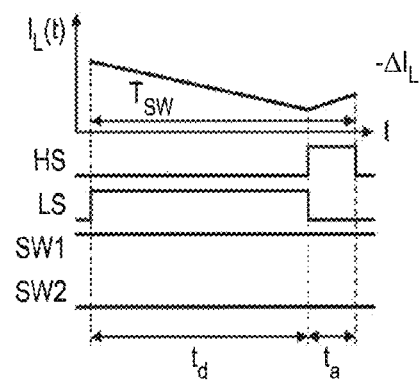

FIG. 3(b) illustrates the switching sequence in an OCD or OVD interrupt state. In the specific example shown, the interrupt has been called from the first output 114. The switching sequence comprises of a short first charging phase of duration to and a relatively longer first discharging phase of duration td as shown in FIG. 3(b). Note that only these phases are active, as the duration of the second charging phase tb and that of the second discharging phase tc for the second output 115 are each set to zero; i.e., ta<td and tb=tc=0. Switching in this way ensures a consistent and rapid decrease of inductor current $I_L$, and, consequently, of the voltage at the first output 114. Similarly, where the OCD or OVD interrupt is called from the second output 115, the switching sequence is adjusted such that tb<tc and ta=td=0. In determining when to exit such an interrupt state, consider the example of an OCD interrupt state being triggered for the first output. As shown, the duration of discharging phase to is shorter than that of charging phase td. However, during the short charging phase td, the OCD circuit remains active. This enables the determination of whether, by the end of the OCD interrupt state switching period, the sensed current has returned to a normal condition or remains in an abnormal (over current) condition. Determination as to whether the sensed current is in a normal or abnormal condition may be determined by comparison to a threshold current value: e.g., an over current condition is determined if the sensed current is above an over current threshold. The interrupt and "current state" register can be set accordingly. An essentially similar method is used to determine when to exit the OVD interrupt state.

Figure 3C:
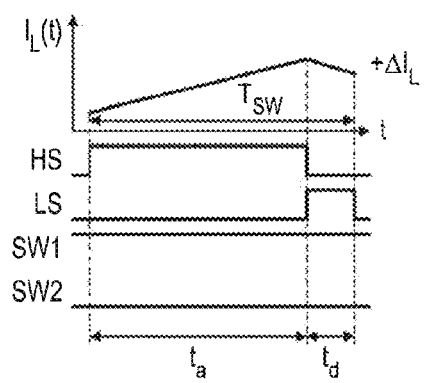

FIG. 3(c) illustrates an example switching sequence during a ZCD or UVD interrupt state having been called from the first output 114. The time durations of the phases are adjusted such that the time duration of the first charging phase to for the first output 114 is extended while the time duration of the first discharging phase td for the first output 114 is decreased. Again, note that during these interrupts, the duration of the second charging phase tb and that of second discharging phase tc of the second output 115 are each set to zero (i.e., ta>td and tb=tc=0). In this way the algorithm ensures a consistent and rapid increase of inductor current $I_L$ and, consequently, of the voltage on the first output 114. Similarly, where the ZCD or UVD interrupt is called from the second output 115, the switching sequence is adjusted such that tb>tc and ta=td=0.

Determining when a ZCD or UVD state should be exited is analogous to exiting an OCD or OVD state, as already described.

Figure 3D:
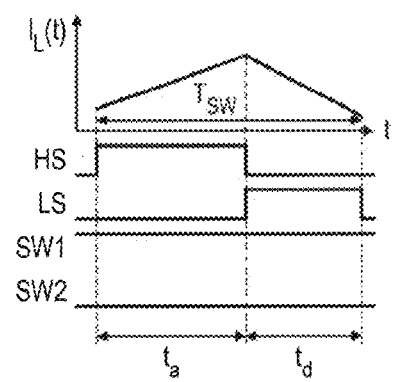

FIG. 3(d) illustrates an example switching sequence during an LDO interrupt state, in this example an "LDO2" state interrupt is called from the second output 115. In this "LDO2" state, the durations of the first charging phase to and first discharging phase td for the first output 114 are adjusted according to the algorithm of steady-state whereas the durations of second charging phase tb and second discharging phase tc are set to zero, since the second output 115 is now supplied by the second LDO (LDO2) rather than by the SIMO. Similarly, if the LDO interrupt is called from the first output 114, the "LDO1" state is entered with the durations of second charging phase tb and second discharging phase tc adjusted in steady-state operation and ta=td=0, with the first output 114 supplied by the first LDO (LDO1).

Time and Amplitude Resolution

Figure 4:
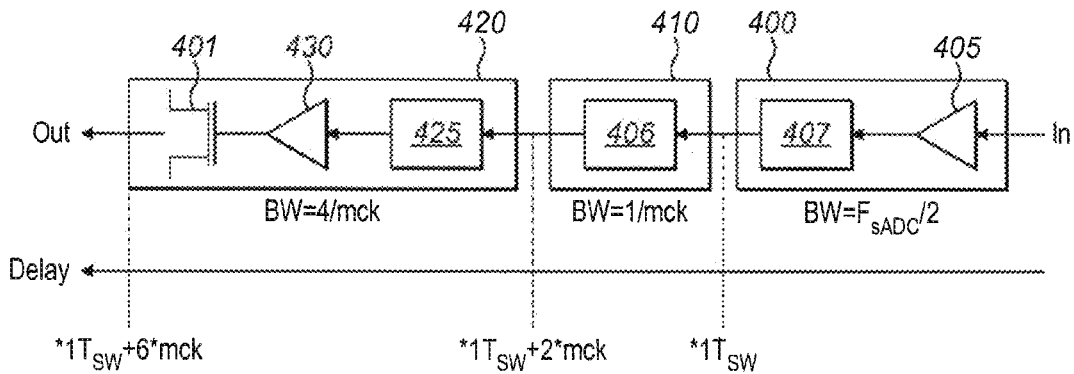
FIG. 4 is a timing diagram illustrating the delays in a mixed-signal feedback loop according to an embodiment of the invention.

The available resolution of time-slots within switching period $T_{sw}$ (i.e., phase durations to, tb, tc and td and therefore the "connected time duration" for each output) depends upon both analogue and digital (mixed-signal) constraints of the technology used. Increasing the resolution of these time-slots requires a corresponding increase in the bandwidth of the mixed-signal feedback loop constituting the regulator. Having a bandwidth much higher than switching period $T_{sw}$ may, for example, cause instability in the SIMO, if compensation in the mixed signal feedback loop is not provided. Referring to FIG. 4, in this embodiment the mixed-signal feedback loop is subdivided into three parts. The first part 400 comprises analogue pre-conditioning of the output voltages, including sampling and quantisation, by low-pass filter 405 and ADC 407 of each output. ADC 407 may be the appropriate one of ADCs 107, 108 of FIG. 1. The second part 410 relates to the "CCECSP" FSM 406 (corresponding to FSM 106), reading the ADC 407 outputs, performing calculations and determining actuating and control signals for the SIMO regulator. The third part 420 comprises a dead-time generator 425, followed by the switch drivers 430 and the switches 401 (corresponding to pairs of switches 101, 102).

In the specific exemplary embodiment presented, the resolution with which phase durations ta, tb, tc, and td are calculated is set to be at least lower than or equal to one-hundredth of the switching period ($T_{sw}/100$). In a more specific example, clock multiplier mck is defined as a digital representation of the switching period $T_{sw}$ having a digital resolution of 128. In an embodiment, this resolution can be stretched by 100% through a 5-bit ([0:32] interval) coefficient MCLK, i.e. mck=128+MCLK*4. The ADCs 407 have the main role to digitise the output voltages both in time and in amplitude. The sampling period, i.e. $1/F_{sADC}$, of the ADCs should be at least lower than or equal to switching period $T_{sw}$. Pre-conditioners for ADCs have a bandwidth BW of $F_{sADC}/2$ in order to avoid aliasing. The ADC sampling introduces a delay in $T_{sw}$ within the chain. The number of bits of ADCs 407 determines the accuracy by which the SIMO can settle the outputs. In this embodiment the ADCs have 10-bit resolution and are used to set the amplitude resolution $A_{RBS}$ for the regulator, i.e. $A_{RBS}$=VDD/1024. The proposed "CCECSP" FSM 406 is able to control output voltages within $6*A_{RES}$ accuracy. The total accumulated delay is a further parameter on which the SIMO system stability depends, and in this context it is limited to $T_{sw}$+ 6*mck. Due to this unavoidable delay, the effective minimum time-slot for the charging and discharging phases is limited to 4*mck, i.e., the delay induced by the third part 420 of the chain.

"Start-Up" and "Steady-State" Algorithmic State Machines

Figure 5:
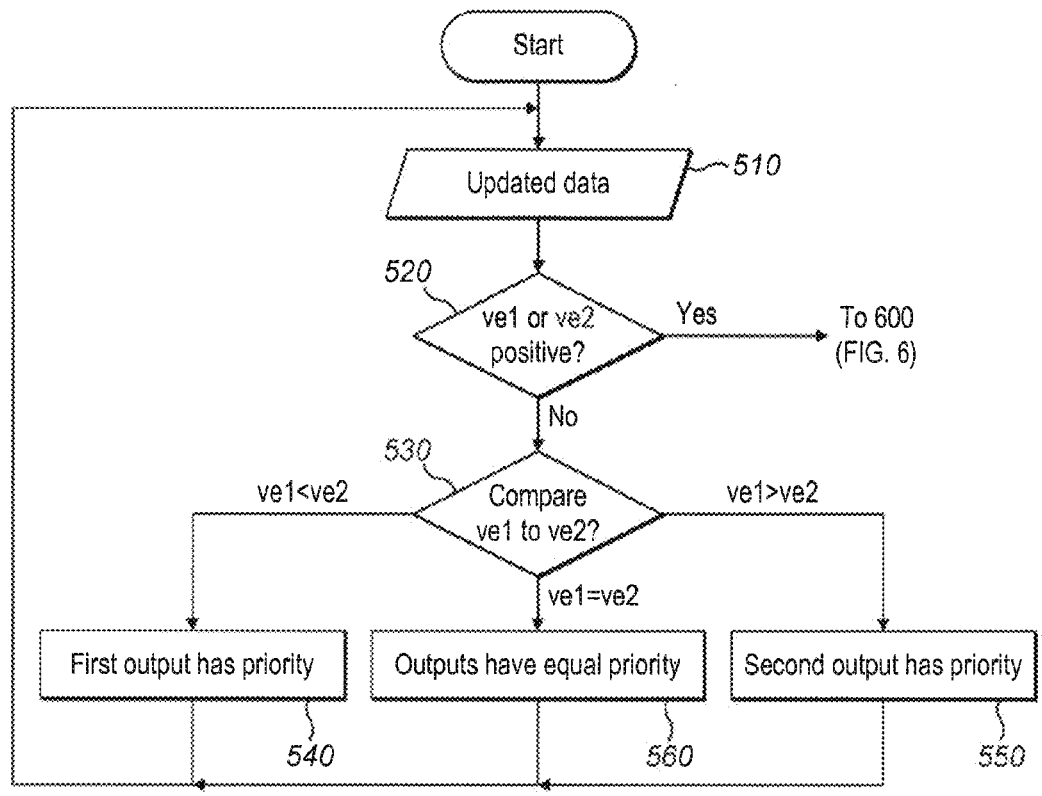
FIG. 5 is a flow diagram describing a "start-up" state according to an embodiment of the invention.
Figure 6:
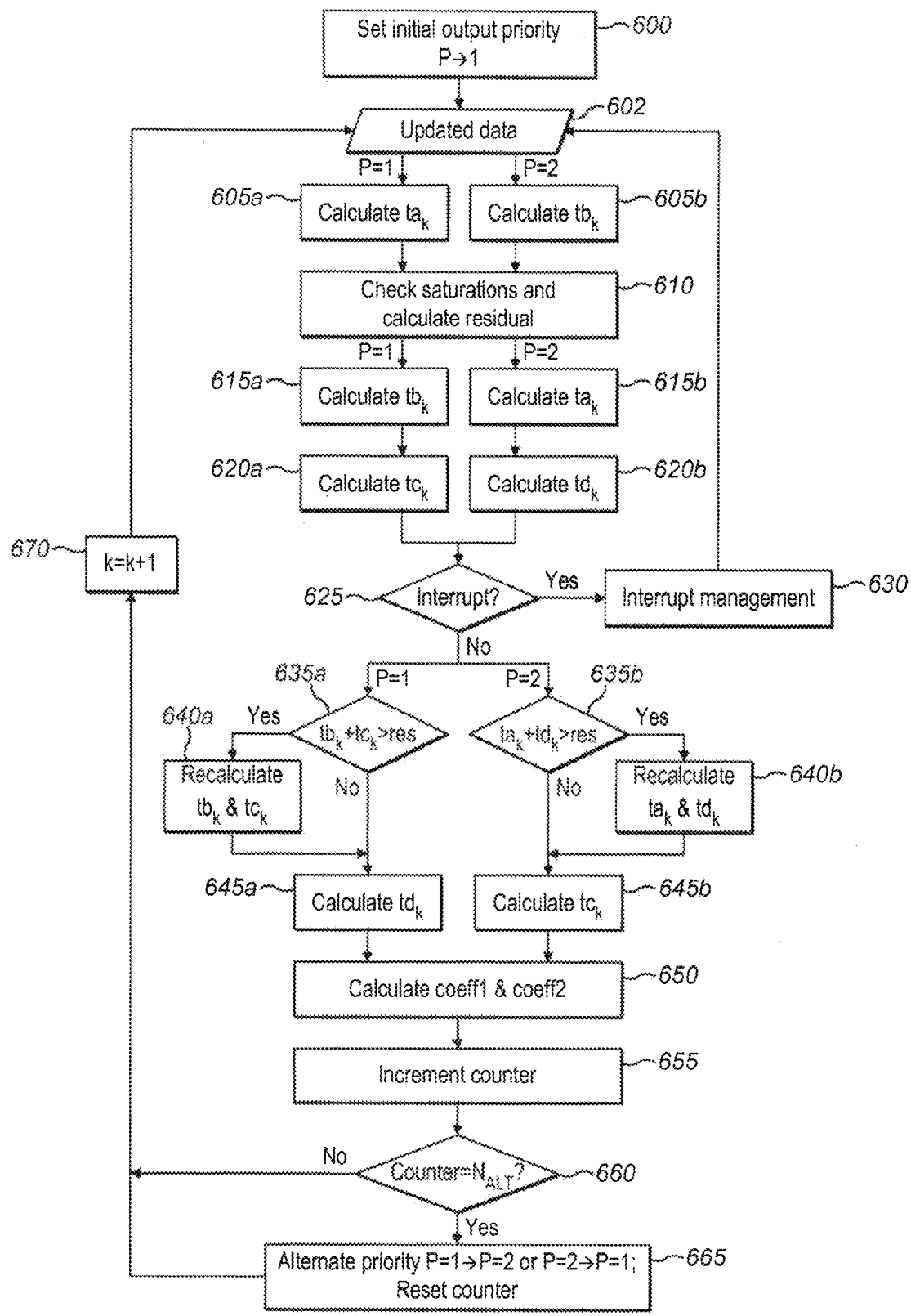
FIG. 6 is a flow diagram describing a "steady state" state according to an embodiment of the invention.

FIG. 5 is a flow diagram showing steps of an exemplary algorithm of the algorithmic state machine (ASM) which implements the "start-up" state. In the "start-up" state, the algorithm determines the phase durations ta, tb, tc, and td, and therefore the connected time duration for each output, in dependence only on the relationship between a first error voltage ve1 and a second error voltage ve2. First error voltage ve1 is calculated as the difference between the voltage vout1 at the first output 114 and a predetermined required voltage level vr1 for the output 114, and the second error voltage ve2 is calculated as the difference between the voltage vout2 at the second output 115 and a predetermined required voltage level vr2 for the output 115. If one error voltage is lower than the other it assumes the highest priority in the ASM. This procedure ensures both outputs are brought into the vicinity of the respective required output voltage level. As soon as one of the error voltages becomes positive during "start-up" the FSM states transitions to the "steady-state" state (FIG. 6).

At step 510, updated data from the ADCs 107, 108 is received, comprising updated values for the output voltages vout1, vout2 and the supply voltage VDD. At step 520, it is determined whether either one of error voltages ve1 and ve2 has become positive. If yes, "steady-state" state is entered and control transitions to the ASM of FIG. 6. If no, error voltages ve1 and ve2 are compared (step 530): if ve1<ve2, priority is given to charging first output 114 (step 540), if ve1>ve2, priority is given to charging second output 115 (step 550) and if ve1=ve2, equal priority is given to charging both outputs 114, 115 (step 560). In each case, the algorithm then returns to step 510. This principle can be extended to arrangements with more than two outputs. In such a method error voltages from all the outputs are compared, and charging priority is assigned to the output having the highest absolute error voltage (the error voltages should all have negative values at start-up), with no priority assigned if all error voltages are equal. This process will end when at least one among outputs has reach its desired voltage (i.e., the error voltage goes positive).

In the "steady state" state, the phase durations ta, tb, tc, and td, and therefore the connected time duration for each output, are based on the present error voltage and at least one historical error voltage sampled from at least one of the outputs. FIG. 6 is a flow diagram showing steps of an exemplary algorithm of the algorithmic state machine (ASM) which implements the "steady-state" state. In this "steady-state" state, in an initial (optional) step 600, the initial priority output is set, such that one of the outputs is designated as a priority output P. This determines for which output the initial charging (or discharging) phase duration is first calculated. This concept is explained in more detail under the heading "Alternating the output Priority" below. In embodiments where the priority output is fixed, for each pair of steps suffixed a and b (e.g., 605a and 605b), only those suffixed a (or alternatively only those suffixed b) may be present. In this example, the initial switching priority P is set to the first output (i.e., P=1), although this is purely arbitrary.

At step 602, updated data from the ADCs 107, 108 is received, comprising the most recently sampled values for the output voltages vout1, vout2 and the supply voltage VDD.

Figure 7:
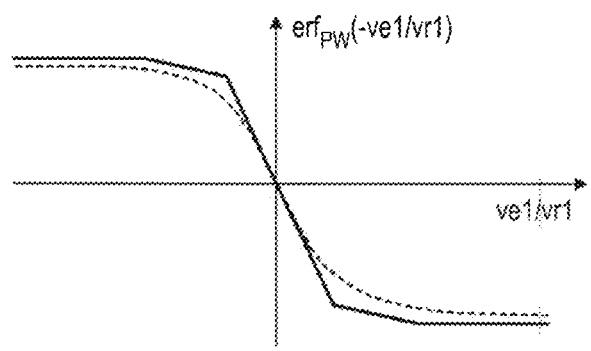
FIG. 7 is a plot of an exemplary error function and a piece-wise linear approximation thereof.

At step 605a (the output priority being set to the first output in this example), the duration or length of first charging phase $ta_k$ may be calculated by an iterative update of duration $ta_{k-1}$, where discrete steps k correspond to a switching period $T_{sw}$. In an embodiment, first charging phase duration $ta_k$ may be calculated by:

$$ta_k = ta_{k-1} + mck \times coeff1_{k-1} \times f_{pw}\left(\frac{-ve1_{k-1}}{vr1}\right) \quad \text{Equation (1)}$$

where coeff1 is a coefficient dependent on the history of the error voltage ve1 (this coefficient will be described in more detail later) and the function $$f_{pw}\left(\frac{-ve1_{k-1}}{vr1}\right)$$

is a five-step piece-wise linear (spline) error function dependent on the ratio of the error voltage of the first output $ve1_{k-1}$, (i.e. at the previous iteration) and the required output voltage vr1 at the first output. This piece-wise linear error function is an approximation of error function $$f\left(\frac{-ve1_{k-1}}{vr1}\right)$$

as shown in FIG. 7, this figure being a plot of bot $$f\left(\frac{-ve1_{k-1}}{vr1}\right)$$

(dotted line) and $$f_{pw}\left(\frac{-ve1_{k-1}}{vr1}\right)$$

(solid line) against $$\frac{-ve1_{k-1}}{vr1}.$$

The error function shown is purely exemplary and its actual form is not critical to the concepts disclosed herein. As such, the error function may take a different form to that illustrated here.

At step 610, saturations (min and max) in the charging phase duration calculated in the previous step, here first charging phase duration $ta_k$, are checked. The min saturation is imposed by technological constraints (it is the minimum required time to switch on and off pairs of switches 101, 102) whereas the max saturation is calculated to ensure there is sufficient time within the overall switching period for calculating and assigning the remaining time-slots. A partial residual res is then calculated as the difference of clock multiplier mck with the charging phase duration calculated in the previous step and with two minimum discharging time-slots min; i.e., the appropriate one of.

$$res = mck - ta_k - 2\ min. \quad \text{Equation (2a)}$$

$$res = mck - tb_k - 2\ min \quad \text{Equation (2b)}$$

At step 615a, second charging phase duration $tb_k$ is calculated in a similar manner as first charging phase duration $ta_k$, using the values applicable to the second output:

$$tb_k = tb_{k-1} + mck \times coeff2_{k-1} \times f_{pw}\left(\frac{-ve2_{k-1}}{vr2}\right) \quad \text{Equation (3)}$$

where coeff2 is a coefficient dependent on the history of the error voltage ve2 and the function $$f_{pw}\left(\frac{-ve2_{k-1}}{vr2}\right)$$

is a five-step piece-wise linear (spline) error function dependent on the ratio of the error voltage of the second output $ve2_{k-1}$ (i.e. at the previous iteration) and the required output voltage vr2 at the second output.

At step 620a, second discharging phase duration $tc_k$ is calculated as:

$$tc_k = tb_k * slope2 \quad \text{Equation (4)}$$

where:

$$slope2 = \frac{VDD}{vout2} - 1 \quad \text{Equation (5)}$$

At step 625, it is determined whether an interrupt has occurred: if so, interrupt management is performed at step 630 and the algorithm returns to step 602; if not it is determined at step 635a whether the sum of second charging phase duration $tb_k$ and second discharging phase duration $tc_k$ exceed the residual res. If so, at step 640a, second charging phase duration $tb_k$ and second discharging phase duration $tc_k$ are recalculated to fit the residual through the ratio slope2. This ratio ensures that no variation in charging and discharging for the second output occurs in the current switching period $T_{sw}$. As such second charging phase duration $tb_k$ may be recalculated as:

$$tb_k = \frac{res}{1 + slope2}. \quad \text{Equation (6)}$$

Second discharging phase duration $tc_k$ is then recalculated according to Equation (4) with the recalculated $tb_w$.

At step 645a, the first discharging phase duration $td_k$ is calculated as the difference of mck and the sum of other phase durations $ta_k$, $tb_k$ and $tc_k$; i.e., $$td_k = mck - ta_k - tb_k - tc_k \quad \text{Equation (7)}$$

The above calculation order above is exemplary. It is a matter of design choice for which connected time duration or phase a first calculation is performed (i.e., which output is designated as the priority output). In the specific example above, a calculation is first performed for the connected time duration corresponding to the first output, specifically for the first charging period. However this first calculation may be performed for the second charging period, i.e., the initial switching priority may be set to the second output (P=2) at step 600. In such an example, steps 605a, 615a, 620a, 635a, 640a, 645a are substituted by steps 605b, 615b, 620b, 635b, 640b, 645b, as follows:

In step 605b, second charging phase duration $tb_k$ may be calculated according to Equation (3);

In step 615b, first charging phase duration $ta_k$ may be calculated according to Equation (1);

In step 620b, first discharging phase duration td, may be calculated as:

$$td_k = ta_k * slope1 \quad \text{Equation (8)}$$

where:

$$slope1 = \frac{VDD}{vout1} - 1 \quad \text{Equation (9)}$$

In step 635b, the sum of phase durations $td_k + ta_k$ are compared to the residual and if greater, in step 640b, first charging phase duration $ta_k$ may be recalculated as:

$$ta_k = \frac{res}{1 + slope1}. \quad \text{Equation (10)}$$

and first discharging phase duration $td_k$ recalculated according to Equation (8) with the recalculated $ta_k$; and In step 645b, second discharging phase duration $tc_k$ may be calculated as:

$$tc_k = mck - ta_k - tb_k - td_k \quad \text{Equation (11)}$$

Also, of course, the algorithm would be adapted where there are more than two outputs, to calculate charging and discharging phases for each output, and optionally to enable output priorities for the three or more outputs to be set and/or varied, such that each output may be designated as priority output.

Optionally (as described in detail below), the order of calculation (i.e., the designated priority output) may be switched periodically during operation to reduce cross-regulation. Also, while the examples above show the charging phases being calculated first (based on historical averages as described in the next section), the discharge phases may instead be calculated first in this manner.

History of Output Voltage Averages

At step 650, coefficients coeff1 and coeff2 are updated. These coefficients effectively increase the time resolution, and hence bandwidth, of the system as the magnitude of the error voltage at the corresponding output increases relative to the magnitude of an historical average of that error voltage.

In this step, a respective error voltage moving average is used to update the coefficients coeff1 and coeff2 depending on the sign of the average errors. The coefficients in each step are updated by ±1, or else left unchanged. For each switching period $T_{sw}$, a sliding window is used on the last N error voltage readings (where N may be any integer; e.g, N may be between 1 and 20, between 1 and 10 and more specifically 4 or 8). In an embodiment, every measurement has the same weight in the calculated averages, $ve1_{avg}$ and $ve2_{avg}$, such that:

$$ve1_{avg}[k] = \frac{1}{n}\sum_{i=1}^{n} ve1[k-i] \qquad \text{Equation (12)}$$

$$ve2_{avg}[k] = \frac{1}{n}\sum_{i=1}^{n} ve2[k-i] \qquad \text{Equation (13)}$$

After this a comparison is made with the current error voltages to update the coefficients coeff1 and coeff2 such that:

if abs($ve1[k]$)>abs($ve1_{avg}[k]$)

then coeff1[k] is incremented by unity, else if abs($ve1[k]$)=abs($ve1_{avg}[k]$)

then coeff1[k] is left unchanged, else if abs($ve1[k]$)<abs($ve1_{avg}[k]$)

then coeff1[k] is decremented by unity. Coefficient coeff2[k] is updated in the same manner, using as operators the values ve2[k] and $ve2_{avg}[k]$. This if-then-else condition can be represented as follows:

$$\text{coeff1}[k]=\text{coeff1}[k-1]+\text{sgn}(\text{abs}(ve1[k])-\text{abs}(ve1_{avg}[k])), \qquad \text{Equation (14)}$$

$$\text{coeff2}[k]=\text{coeff2}[k-1]+\text{sgn}(\text{abs}(ve2[k])-\text{abs}(ve2_{avg}[k])), \qquad \text{Equation (15)}$$

The update process for coefficients coeff1 and coeff2 hence represent a superposition of a first-order infinite impulse response (IIR) filter with a non-linear function of low-pass finite impulse response (FIR) filter. This combination is thus a non-linear time-variant filtering. The main effect off such non-linear time-variant filtering is to adapt the transient response to the error voltages ve1 and ve2, thereby improving stability: as an error voltage becomes greater in absolute value, the bandwidth of the system is increased enabling fast convergence of the system to a desired steady-state regime whereas a decrease of an error voltage translates into a progressive reduction in the bandwidth and consequent improvement in stability.

Alternating the Output Priority

In the specific embodiment shown, at step 655, a priority counter counting the number of switching cycles is incremented and at step 660, it is determined whether the priority counter equals a predetermined threshold value $N_{ALT}$: if not the algorithm increments k in step 670 and returns to step 602 for the next iteration, k=k+1. If however, the priority counter does equal $N_{ALT}$, the designated priority output is alternated in step 665 such that, where the first output was designated priority output (P=1), this is switched to the second output (P=2) and vice versa, and the priority counter is reset. The algorithm increments k in step 670 and then returns to step 602 for the next iteration, k=k+1. Assuming now that the second output is the designated priority output in this next iteration, the algorithm will (based on updated data 602) first calculate $tb_k$ at step 605*b*, with the subsequent phase duration calculation steps being those appropriate for P=2 (i.e., those steps suffixed b).

In this way, on every $N_{ALT}$ switching cycles, the algorithm alternates for which output the charging phase (and consequently discharging phase) is first calculated. Periodically alternating the order with which the loads are connected to inductor further reduces cross-regulation of the two outputs. A first effect that this alternation of switching priority addresses is cross-regulation introduced by a systematic bias due to the order of calculation of the charging phases. By periodically changing priority, this bias is periodically switched to a different output. A second effect concerns the physical switching constraints and the sign of the spike which results from switching the output switches: by changing the priority to the other output, the sign of the spike is inverted.

Figure 8:
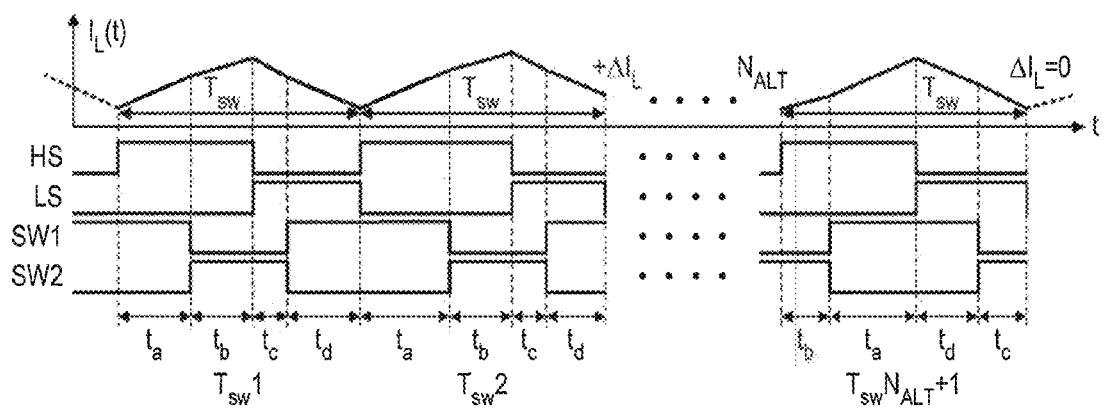
FIG. 8 is a timing diagram illustrating a "steady state" state, according to an embodiment of the invention.

FIG. 8 is a timing diagram of a steady state operation as described by FIG. 6. In switching period $T_{sw1}$, first output and second output are in steady state. In switching period $T_{sw2}$, the current at the first output is increasing with no change on the second output. Consequently, charging phase duration to increases. As the sum of phase durations tb and tc are lower than the residual, discharging phase duration td reduces. As a result, there is a positive current residual $+\Delta I_L$ in the inductor by the end of switching period $T_{sw}2$. After several switching periods, due to the effect of the increased average inductor current, the sum of phase durations tb and tc will decrease slightly to reach a new steady state. Also shown is a switching period $T_{sw}N_{ALT}+1$, i.e., the period immediately after $N_{ALT}$ cycles have passed. It can be seen that the priority in assigning the charging and discharging phases for the first and second outputs have been alternated, such that second charging phase duration tb is calculated first.

Where there are more than two outputs, it is proposed that the priority output is switched between the outputs (e.g., rotated around the outputs), with the priority output being switched to a different output periodically, for example every $N_{ALT}$ switching periods. The switching between outputs may be in accordance with a predetermined order. Note that priority output in this context refers (in the widest sense) only to the priority in the order of calculation of at least a first portion of its corresponding connected time duration. In a main embodiment, this first portion may be the corresponding charging phase, although it may instead be the corresponding discharging phase.

Avoidance of Invalid Steady-State Regimes

A known issue regarding SIDO regulators can occur when the difference between the load currents (the current ratio) at the two outputs is too high, e.g., when the current drawn at a first output is more than 30 times greater than the current drawn at the second output. In such a case the cross-regulation does not allow proper regulation of the second output voltage.

To overcome this, digital logic may be added to detect a "locked" steady state condition followed by a determination as to whether the steady-state condition is valid or invalid.

To determine whether a locked steady state condition is entered, a stable counter may be employed and incremented each switching period $T_{sw}$ if the immediately previous M output voltage averages $ve1_{avg}$, $ve2_{avg}$ at each output have presented no change, where M is any integer. In specific embodiments, integer M may be, for example, between 1 and 20, between 1 and 10 and more specifically 4 or 8. If the stable counter reaches a given threshold, the system is deemed to be in a "locked" condition. It is then determined whether the locked condition is a valid locked condition. This can be determined, for example by comparing the output voltages the system has settled on to the required voltages respective required voltages vr1, vr2. If the each output voltage equals (or is below) its respective required voltage vr1, vr2 (within an acceptable margin) operation is deemed valid and continues as before (e.g., in the "steady state" state). Where the voltage at one of the outputs is deemed to have deviated too far from the respective required voltage in a locked condition (i.e., an invalid locked condition), and in particular where this voltage is too high, an LDO interrupt state is entered. In the LDO interrupt state, the corresponding output deemed to be at the incorrect voltage is fed by an LDO, leaving the other output connected as a (single output) step-down DC-DC regulator, or where there are more than two outputs, with the remaining outputs continuing to be connected and controlled as a SIDO/SIMO according to the methods described herein.

Implementation Example

The concepts disclosed herein may be implemented in a submicron CMOS process using standard devices. CMOS transistors may be used to implement the ADCs and switches while the FSM and drivers may be implemented using digital cells. Hence it is a mixed-signal circuit. Phase durations ta, tb, tc and td may comprise non-overlapped phase durations to prevent charge sharing and charge loss between the nodes connected to the inductor.

An advantage of implementing the FSM digitally is that it can be readily ported to other CMOS processes and, in addition, can be easily adapted to handle any number of outputs.

It should be appreciated that the above description is for illustration only and other embodiments and variations may be envisaged without departing from the spirit and scope of the invention. Terms such as "coupled to" and "connected to" are synonymous and should be understood to encompass situations where the connection or coupling is not direct (e.g., where there may be intervening elements or devices). In the specific exemplary embodiments, where switches and resistances are shown, it should be appreciated that this is purely by way of example and any suitable equivalent or similar devices may be used where it is possible to do so, or where there would be little effort for the skilled person to use such a suitable equivalent or similar device. As such the switches, resistances etc. may comprise any of, and where possible, any combination of: MOSFETs, LD-MOSFETS, other transistor devices or other switching devices.

The invention claime is:

1. A circuit for controlling a single-inductor multiple-output voltage regulator, wherein the voltage regulator comprises the single inductor and is configured to generate an independent regulated voltage at each of a plurality of outputs, the circuit comprising:
a plurality of output switches configured to selectively connect respectively each of the plurality of outputs to a first inductor terminal of the inductor; [[and]]
a controller configured to control the plurality of output switches in a plurality of switching periods such that, in an operational state, each of the plurality of outputs is periodically connected to the first inductor terminal for a respective connected time duration to generate the regulated voltage at a corresponding output; and
at least one analog-to-digital converter configured to sample the generated regulated voltage at each of the plurality of outputs,
wherein the connected time duration is dependent on at least one historical voltage value sampled in an earlier switching period on at least a first output of the plurality of outputs, and
wherein the controller is further configured to determine an average voltage value as a moving average of historical error voltage values sampled over a plurality of earlier switching periods on the first output.

2. The circuit of claim 1, wherein the controller is further configured to:
determine the connected time duration based on at least the average voltage value.

3. The circuit of claim 2, wherein:
determining the average voltage value is determined for each of the plurality of outputs as a moving average of historical error voltage values sampled over a plurality of earlier switching periods on a corresponding one of the outputs, and
determining the connected time duration is determined for each of the plurality of outputs based on the average voltage value for each of the plurality of outputs.

4. The circuit of claim 3, wherein the controller is configured to determine the connected time duration for each of the plurality of outputs based on the average voltage value for each of the plurality of outputs.

5. The circuit of claim 2, wherein the controller is further configured to, for each of the plurality of outputs, control a system bandwidth of a feedback control loop for controlling a voltage at a corresponding one of the outputs based on a comparison of the average voltage value and a most recently sampled error voltage value at the corresponding output.

6. The circuit of claim 5, wherein:
the controller is further configured to, for each of the plurality of outputs, determine an error function coefficient based on the comparison of the average voltage value and the most recently sampled error voltage value at the corresponding output, and
an error function, to which the error function coefficient is applied depends on the most recently sampled error voltage at the corresponding output.

7. The circuit of claim 6, wherein the error function coefficient superposes a first-order infinite impulse response filter with a finite impulse response filter.

8. The circuit of claim 6, wherein the controller is further configured to update the error function coefficient iteratively per switching period by performing at least one of:
incrementing the error function coefficient if a magnitude of the most recently sampled error voltage at the corresponding output is greater than a magnitude of the average voltage value for the corresponding output;
decrementing the error function coefficient if the magnitude of the of the most recently sampled error voltage at the corresponding output is less than the magnitude of the average voltage value for the corresponding output; or
maintaining the error function coefficient at a certain value.

9. The circuit of claim 1, wherein the controller is further configured to:
  determine whether the voltage regulator is in a locked condition;
  if the voltage regulator is in the locked condition, determine whether the locked condition is valid; and
  if the locked condition is invalid, supply one or more of the plurality of outputs using an alternative voltage regulator.

10. The circuit of claim 9, wherein the controller determines that the voltage regulator is in the locked condition if an average voltage value for each of the plurality of outputs shows no change over a predetermined number of switching periods.

11. The circuit of claim 9, wherein:
  determining whether the locked condition is valid comprises determining whether an output voltage at each of the plurality of outputs is at a desired level, and
  supplying the one or more of the plurality of outputs using the alternative voltage regulator comprises supplying an output at which the output voltage is not at the desired level using the alternative voltage regulator.

12. The circuit of claim 1, wherein:
  the controller is further configured to designate one of the plurality of outputs as a priority output,
  the priority output is an output for which at least a first portion of the connected time duration is first calculated, and
  the priority output designation is periodically switched to another output of the plurality of outputs.

13. The circuit of claim 12, wherein the priority output designation is rotated around each of the plurality of outputs.

14. The circuit of claim 12, wherein the controller is further configured to control the plurality of output switches such that the priority output is connected first to the first inductor terminal during a switching period.

15. The circuit of claim 12, wherein the controller is further configured to switch the priority output after every N switching periods, where N is a predetermined number.

16. The circuit of claim 12, wherein the connected time duration comprises a charging phase and a discharging phase during which energy is respectively stored in the inductor and released to one of the plurality of outputs selectively connected, and the first portion of the connected time duration comprises the charging phase or the discharging phase.

17. The circuit of claim 16, wherein the first portion of the connected time duration comprises the charging phase.

18. The circuit of claim 1, wherein the connected time duration comprises a charging phase and a discharging phase during which energy is respectively stored in the inductor and released to one of the plurality of outputs selectively connected.

19. The circuit of claim 1, wherein the voltage regulator is configured to provide a positive regulated voltage at each of the plurality of outputs.

20. The circuit of claim 1, wherein the circuit is configured to control the voltage regulator in one or more interrupt states such that when an overvoltage, an overcurrent, a zero current or an undervoltage condition relating to one of the plurality of outputs is detected, connected time durations for the other of the plurality of outputs are set to zero.

21. The circuit of claim 1, further comprising a finite state machine for controlling the plurality of output switches.

22. The circuit of claim 1, further comprising a plurality of input switches configured to selectively connect a first supply voltage and a second supply voltage to a second inductor terminal of the inductor.

23. The circuit of claim 1, wherein the circuit is further configured to control the voltage regulator in a start-up state, prior to the operational state, by:
  periodically comparing error voltages at the plurality of outputs;
  assigning a charging priority to one of the plurality of outputs having a greatest magnitude of error voltage; and
  maintaining the voltage regulator in the startup state until at least one of a plurality of output voltages reaches a desired level.

24. The circuit of claim 1, wherein the plurality of outputs comprises two outputs and the circuit further comprises a bridge capacitor connected between the two outputs.

25. The circuit of claim 1, wherein the plurality of outputs comprises at least three outputs and the circuit further comprises:
  at least one bridge capacitor; and
  a plurality of bridge capacitor switches configured to selectively connect the at least one bridge capacitor to the plurality of outputs,
  wherein the controller is configured to switch the at least one bridge capacitor between any two of the plurality of outputs that are 180 degrees out-of-phase in output switching transition.

* * * * *